(12) United States Patent
Anderson

(10) Patent No.: US 8,792,206 B2
(45) Date of Patent: Jul. 29, 2014

(54) METHOD AND APPARATUS FOR CONTROLLED FRONT SHIELD THICKNESS FOR PERPENDICULAR WRITER

(75) Inventor: Paul Edward Anderson, Eden Prairie, MN (US)

(73) Assignee: Seagate Technology LLC, Cupertino, CA (US)

( * ) Notice: Subject to any disclaimer, the term of this patent is extended or adjusted under 35 U.S.C. 154(b) by 786 days.

(21) Appl. No.: 12/467,736

(22) Filed: May 18, 2009

(65) Prior Publication Data

US 2010/0290156 A1 Nov. 18, 2010

(51) Int. Cl.
- G11B 5/23 (2006.01)
- G11B 5/31 (2006.01)
- G11B 5/127 (2006.01)

(52) U.S. Cl.
CPC ............ G11B 5/3169 (2013.01); G11B 5/3116 (2013.01); G11B 5/1278 (2013.01); G11B 5/3163 (2013.01)
USPC ....................... 360/119.01; 216/22; G9B/5.06

(58) Field of Classification Search
None
See application file for complete search history.

(56) References Cited

U.S. PATENT DOCUMENTS

| | | | |
|---|---|---|---|
| 6,510,030 B1 * | 1/2003 | Song et al. | 360/319 |
| 7,014,530 B2 | 3/2006 | Kasiraj et al. | |
| 7,120,988 B2 | 10/2006 | Le et al. | |
| 7,130,153 B2 * | 10/2006 | Shen et al. | 360/125.55 |
| 7,199,973 B2 | 4/2007 | Lille | |
| 7,522,392 B2 * | 4/2009 | Carey et al. | 360/324.2 |
| 8,333,008 B1 * | 12/2012 | Sin et al. | 29/603.16 |
| 2005/0068665 A1 | 3/2005 | Le et al. | |
| 2005/0068673 A1 | 3/2005 | Lille | |
| 2005/0157423 A1 * | 7/2005 | Sasaki et al. | 360/123 |
| 2005/0180048 A1 | 8/2005 | MacDonald et al. | |
| 2005/0190491 A1 | 9/2005 | Le et al. | |
| 2005/0259357 A1 * | 11/2005 | Kameda | 360/126 |
| 2006/0092564 A1 | 5/2006 | Le | |
| 2006/0215314 A1 | 9/2006 | Chen | |
| 2008/0259498 A1 * | 10/2008 | Lengsfield et al. | 360/235.4 |
| 2009/0251827 A9 * | 10/2009 | Pokhil et al. | 360/317 |
| 2010/0232072 A1 * | 9/2010 | Dimitrov et al. | 360/319 |

FOREIGN PATENT DOCUMENTS

| | | | |
|---|---|---|---|
| JP | 2004-295987 A | 10/2004 | |
| JP | 2006-004591 A | 1/2006 | |

* cited by examiner

Primary Examiner — Kevin Bernatz
(74) Attorney, Agent, or Firm — HolzerIPLaw, PC (57) ABSTRACT

A method for forming a transducing head having a magnetic writer includes forming a pedestal adjacent to a writer pole and a gap layer, depositing a front shield on the pedestal, etching the front shield, and depositing a backfill layer upon the front shield after etching. The front shield has a controlled thickness upon etching.

18 Claims, 9 Drawing Sheets

METHOD AND APPARATUS FOR CONTROLLED FRONT SHIELD THICKNESS FOR PERPENDICULAR WRITER

BACKGROUND

Hard disc drives (HDDs) typically comprise one or more magnetic media discs or other magnetic storage media, each having concentric data tracks for storing data. Where multiple discs are used, a stack is formed of co-axial discs having generally the same diameter. A transducing head carried by a slider is used to read from and write to a data track on a given disc. The slider is carried by a head arm assembly (HAA) that includes an actuator arm and a suspension assembly, which can include a load beam and a gimbal. The gimbal can be a separate metallic element secured to the load beam to support the slider thereon, or can be integrally formed with the load beam. During operation, as an associated disc spins, the slider glides above the surface of the disc on a small cushion of air. The actuator arm pivots to movably position the slider with respect to the disc. A microactuator assembly can be included to provide additional precision positioning of the suspension assembly and the slider. Electrical connections extend along the suspension to electrically connect the transducing head to components located at or near the actuator arm. Those electrical connections can be formed on the suspension itself, or can be located on a separate interconnect structure supported relative to the suspension, such as a flex-on suspension (FOS).

Magnetic storage media can store data as bits with magnetization directions in-plane, or perpendicular to a plane of the media. Greater storage densities can generally be achieved with perpendicular recording.

The slider includes a slider body and an overcoat that includes the transducing head. The overcoat is electrically insulative. A plurality of bond pads are formed on the slider, such as at a trailing edge or top surface of the slider, for electrically connecting elements of the transducing head to external circuitry through the overcoat.

The transducing head typically includes a writer and a reader. The reader includes a sensor for retrieving magnetically encoded information stored on the disc (or other magnetic storage medium). Magnetic flux from the surface of the disc causes rotation of a magnetization vector of a sensing layer or layers of the sensor, which in turn causes a change in the electrical properties of the sensor that can be detected by passing a current through the sensor and measuring a voltage across the sensor. Depending on the geometry of the sensor, the sense current may be passed in the plane (CIP) of the layers of the sensor or perpendicular to the plane (CPP) of the layers of the sensor. External circuitry then converts the voltage information into an appropriate format and manipulates that information as necessary to recover information encoded on the disc.

The writer, for a perpendicular recording transducing head, typically includes a main pole and a return pole, which are separated from each other at an air bearing surface (ABS) of the transducing head by a gap layer. The return pole can include a front shield (or trailing shield) portion that extends along the ABS. A use of a front shield can offer an improved magnetic field gradient to the writer for improved linear recording density. The main pole and return pole can be connected to each other at a region distal from the ABS by a back gap closer or back via. One or more layers of conductive coils are positioned between the main and return poles, and are encapsulated by electrically insulating layers. The conductive coils can have different configurations, such as helical and pancake configurations. To write data to the disc (or other magnetic storage medium), an electric current is applied to the conductive coils to generate a magnetic field in the disc under a pole tip of the main pole. By reversing the direction of the current through the coils, the polarity of the data written to the magnetic storage medium is reversed, and a magnetic transition is written between two adjacent bits of the magnetic storage medium.

Advances in magnetic recording head technology are driven primarily by a requirement for increased recording density in HDDs. As recording density increases, track widths of data tracks of the magnetic storage media tend to become smaller, that is, track pitch increases. The performance of modern perpendicular magnetic recording heads is related to the magnetic write fields that can be supplied to write to the perpendicular medium, which tends to be reduced when track pitch is relatively high. Configuration of the components of the transducing head can affect performance, with respect to the write fields that can be generated. For instance, relatively high track pitch tends to limit the size of the pole tip of the writer, specifically the pole tip width and reduces the size of the gap layer between the main pole and the front shield (as well as between the main pole and the return pole). Both of those factors tend to weaken the performance of the writer. The presence of the front shield also tends to weaken the performance of the writer in terms of the magnitude of magnetic fields the writer can produce.

SUMMARY

A method for forming a transducing head having a magnetic writer according to the present invention includes forming a pedestal adjacent to a writer pole and a gap layer, depositing a front shield on the pedestal, etching the front shield, and depositing a backfill layer upon the front shield after etching. The front shield has a controlled thickness upon etching.

DETAILED DESCRIPTION

In general, the present invention provides a method and apparatus for controlled thicknesses of front shields (or trailing shields) of magnetic writers in transducing heads of hard disc drives (HDDs). The thickness of front shields (with thickness defined generally in the direction of the throat height) is significant in defining throat height, and is an important parameter in determining the performance of a magnetic writer. In the prior art, the thickness of the front shield has been defined during a lapping process that forms an air bearing surface (ABS) of a transducing head. However, lapping operations tend to have some amount of variation, which can lead to variations in front shield thickness. Depending upon the desired front shield thickness, the equipment used for lapping, and the techniques used to control lapping, lapping variation can represent a significant portion of the total thickness of the front shield. The significance of lapping variation increases with greater areal recording densities. Lapping variations during fabrication can also introduce performance variations between transducing heads of the same design. Thus, control of throat height is important for writer performance, especially for relatively high track pitch writers. The present invention provides a way to define a front shield thickness prior to and independent from a lapping operation. Details of the present invention, as well as advantages and benefits of the invention, will be better understood in view of the description that follows.

Figure 1:
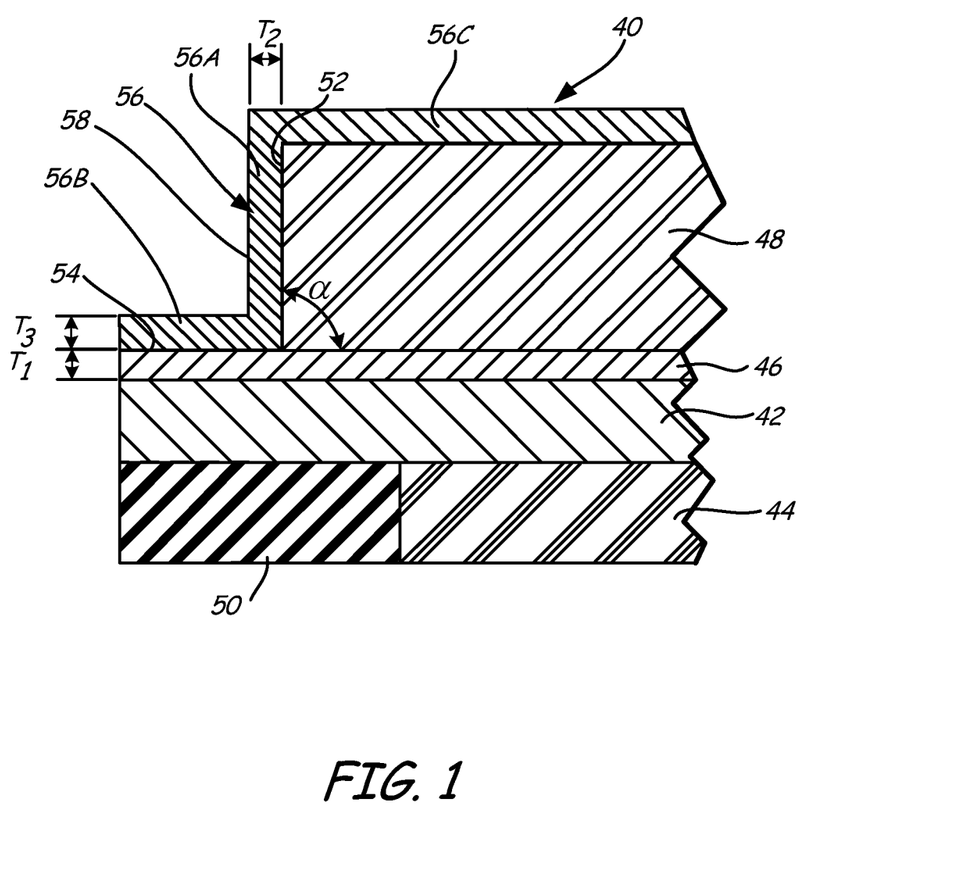
FIGS. 1-3 are cross-sectional views of a portion of a transducing head according to the present invention during various stages of fabrication.
Figure 2:
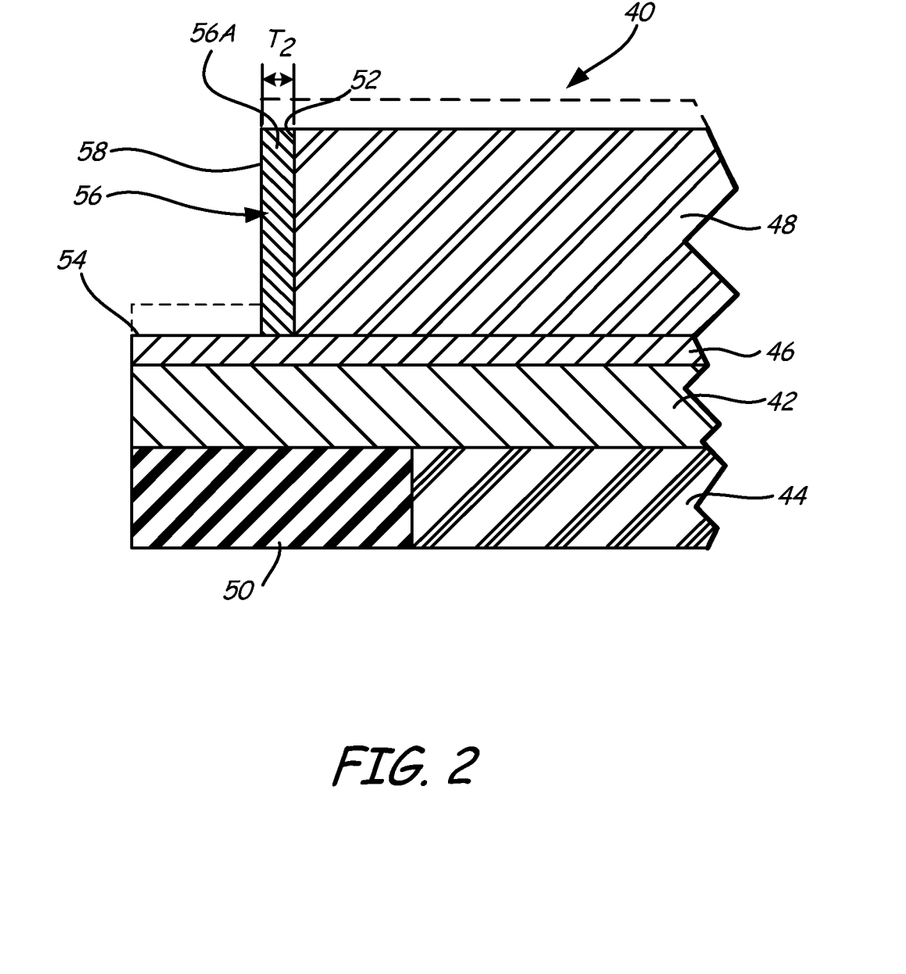
Figure 3:
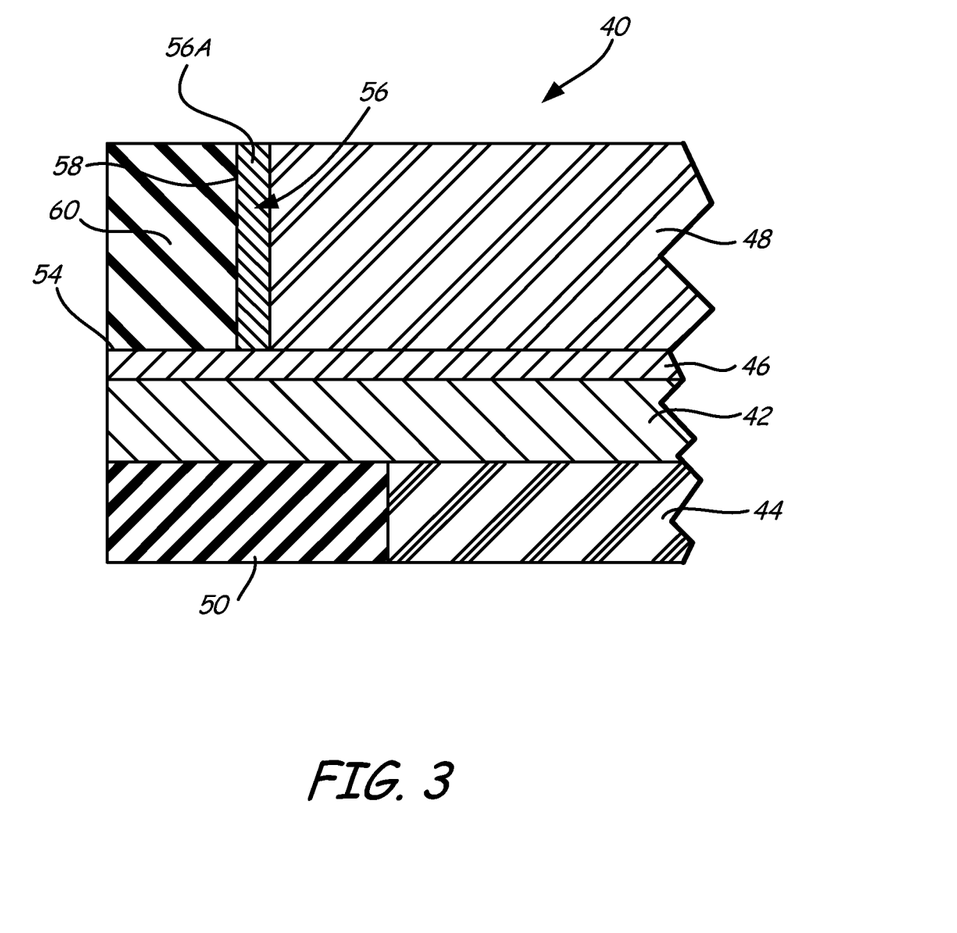

Sliders are typically formed through a process that involves processing a wafer containing many slider/transducing head assemblies that are later separated into individual sliders, though it is still possible to form sliders individually without the use of a wafer. Processing of a wafer, prior to separation of the individual sliders, is generally referred to as wafer-level fabrication. Wafer-level fabrication can involve selective deposition, patterning and removal of material in layers upon a slider body, as well as other processing steps. In many circumstances, processing steps can be performed on all of the slider/transducing head assemblies of the wafer simultaneously. FIGS. 1-3 are cross-sectional views of a portion of a transducing head 40 according to the present invention during various stages of wafer-level fabrication. Although not shown in FIGS. 1-3, a slider body can be located toward the bottom of the illustrated portion of the transducing head 40. Furthermore, it should be noted that the transducing head 40 can include other structures, such as a reader assembly, that are not shown in the figures, for simplicity.

FIG. 1 is a cross-sectional view of a portion of a writer of the transducing head 40 during wafer-level fabrication. The transducing head 40 includes a main writer pole 42, a yoke layer 44, a gap layer 46, a pedestal 48, and backfill 50. The yoke layer 44 and the main writer pole 42 are made of a magnetic flux conducting material, and are arranged in contact with one another. The main writer pole 42 and the yoke 44 can have any suitable configuration, and can be formed using conventional methods. Although not shown, it will be understood by those of ordinary skill in the art that a coil is magnetically coupled to the main writer pole 42, in order to generate a magnetic field in the main writer pole 42 for performing writing operations in a well-known manner. The backfill 50 can be used to fill regions located adjacent to writer components of the transducing head 40, and can be an electrically insulative material. Often the backfill 50 is used to fill voids left by the patterning and removal of portions of other structures during fabrication. As shown in the embodiment of FIG. 1, the backfill 50 is located adjacent to both the main writer pole 42 and the yoke 44.

The gap layer 46 is located upon and adjacent to the main writer pole 42 opposite the yoke 44. The gap layer 46 is typically made of a non-ferromagnetic material. A thickness $T_1$ of the gap layer 46 can vary as desired for particular applications. Reducing the thickness $T_1$ can help to increase linear recording density capabilities of the transducing head 40.

The pedestal 48 is located upon and adjacent to the gap layer 46 opposite the main writer pole 42. The pedestal 48 defines an edge 52 at an angle $\alpha$ with respect to an adjacent surface 54 of the gap layer 46. The angle $\alpha$ can be 90°. In alternative embodiments the angle $\alpha$ can be less than 90°. The edge 52 of the pedestal 48 can extend from the surface 54 of the gap layer 46 across a full thickness of the pedestal 48, and can be formed using conventional patterning (e.g., photolithography) and etching techniques (e.g., ion milling, reactive ion etching, reactive ion beam etching, etc.). The pedestal 48 can be made of carbon, SiC, $Al_2O_3$, hardened photo resist material, Ta, or other suitable materials.

After the gap layer 46 and the pedestal 48 have been deposited and the edge 52 defined, front shield material 56 can be deposited adjacent to the edge 52 of the pedestal 48 and the surface 54 of the gap layer 46. The front shield material 56 can be a magnetic flux conductive material, typically a ferromagnetic material such as NiFe. In the illustrated embodiment, the front shield material 56 can be deposited using ion beam deposition (IBD), plasma vapor deposition (PVD), atomic layer deposition (ALD), or other suitable conformal deposition techniques.

As shown in FIG. 1, the front shield material 56 defines a front shield first portion 56A, a front shield second portion 56B, and a front shield third portion 56C. The front shield first portion 56A has a thickness $T_2$. The front shield second portion 56B extends along the surface 54 of the gap layer 46 and has a thickness $T_3$. The front shield third portion 56C extends along a portion of the pedestal 48, and can have approximately the same thickness $T_3$ as the front shield second portion 56B.

FIG. 2 is a cross-sectional view of the portion of the writer of the transducing head 40 during wafer-level fabrication, at a stage subsequent to that shown in FIG. 1. After the front shield material 56 has been deposited, the front shield material 56 can be etched in order to define a surface 58 of the front shield first portion 56A and to adjust the thicknesses $T_2$ and $T_3$. Etching can alter a ratio of the thicknesses $T_2$ and $T_3$, and can entirely remove selected portions of the front shield material 56. It should be noted that etching can optionally be performed in such a way as to increase the thickness $T_2$ of the front shield first portion 56A though redeposition of material removed from the from shield second portion 56B. Etching techniques for removing a portion of the front shield material 56 can include ion milling, reactive ion etching, reactive ion beam etching, and other suitable etching processes. Etching processes can be performed at the angle $\alpha$ (see FIG. 1), substantially parallel to the edge 52 of the pedestal 48, in order to form the surface 58 of the front shield first portion 56A substantially parallel to the edge 52. After etching, the surface 58 can be substantially planar and arranged substantially parallel to the edge 52 of the pedestal 48. As shown in FIG. 2, the etching operation has entirely removed the front shield second portion 56B and the front shield third portion 56C (the removed front shield second and third portions 56B and 56C are shown in phantom in FIG. 2), leaving the front shield first portion 56A, which can represent the complete front shield structure of the transducing head 40.

Formation of the surface 58 results in definition of a maximum value of the thickness $T_2$. In the illustrated embodiment, the first portion 56A is substantially rectangular in cross-section and contacts the surface 54 of the gap layer 46. A portion of the surface 54 of the gap layer 46 is exposed by the removal of the portion of the front shield material 56 shown in phantom. Upon etching, the thickness $T_2$ can be greater than about 10 nm, such as in the range of approximately 10-100 nm, and in one embodiment can be about 50-100 nm and in another embodiment can be about 50 nm. The particular value of the thickness $T_2$ can vary as desired for particular applications.

FIG. 3 is a cross-sectional view of the portion of the writer of the transducing head 40 during wafer-level fabrication, at a stage subsequent to that shown in FIG. 2. As shown in FIG. 3, backfill 60 is deposited adjacent to the surface 58 of the front shield first portion 56A and the surface 54 of the gap layer 46. The backfill 60 can be a non-ferromagnetic material, such as Ta, and can be a material similar or dissimilar to that of the backfill 50. After the backfill 60 has been deposited, a lapping operation can then be performed to define an ABS for the transducing head 40.

Figure 4:
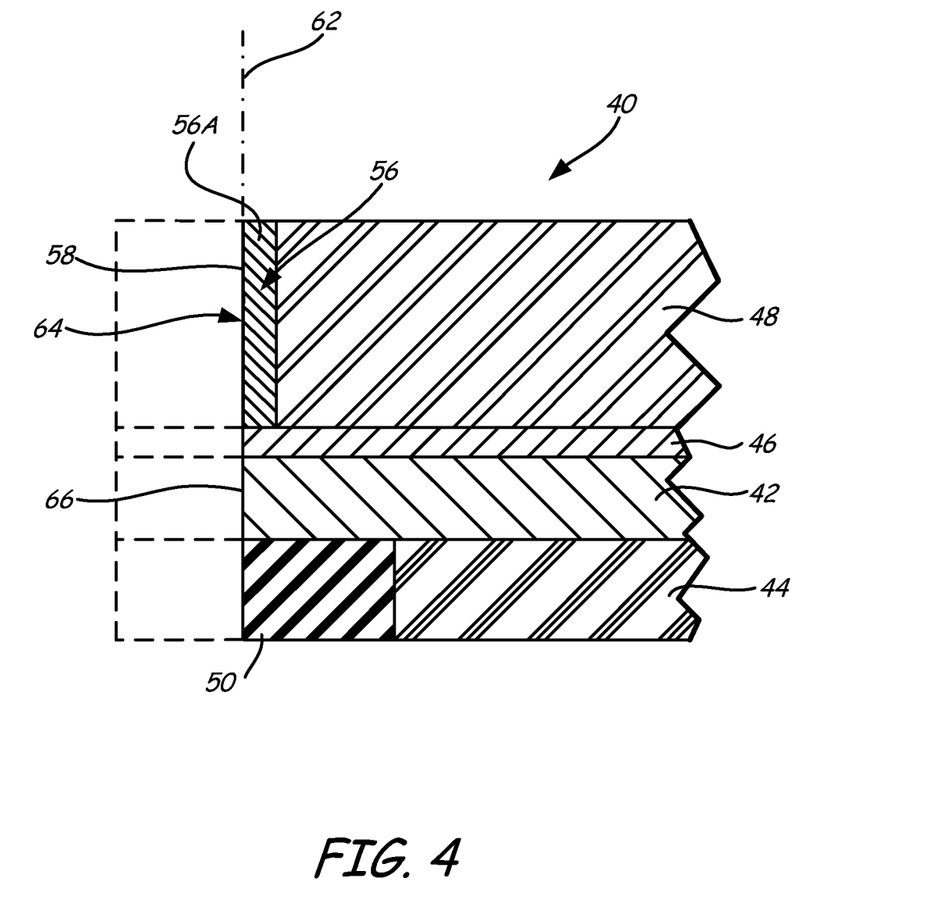
FIG. 4 is a cross-sectional view of an embodiment of the portion of the transducing head of FIGS. 1-3 after completion of fabrication.

FIG. 4 is a cross-sectional view of an embodiment of the portion of the transducing head 40 after completion of a lapping operation, that is, at or near completion of wafer-level fabrication at a stage subsequent to that shown in FIG. 3. Portions of the transducing head 40 removed by the lapping operation are shown in phantom. A lapping target 62 is established at a desired ABS location. The lapping operation can be performed in a conventional manner, using known techniques and equipment. As shown in FIG. 4, lapping defines an ABS 64 at a location that corresponds to the location of the lapping target 62. Lapping also defines a pole tip 66 of the main writer pole 42 at the ABS 64. In the illustrated embodiment, the ABS 64 aligns with and exposes the surface 58 of the front shield first portion 56A and the backfill 60 has been completely removed, but the lapping operation has not changed the thickness $T_2$ of the front shield first portion 56A. Lapping operations generally involve some variation from a given lapping target. For instance, with conventional equipment and techniques, a lapping variation on the order of about plus or minus 15 nm (or less) is common. However, because the maximum value of the thickness $T_2$ was defined prior to the lapping operation, lapping variation will never increase the thickness $T_2$ of the finished transducing head 40, which can help provide more consistent performance characteristics.

Figure 5:
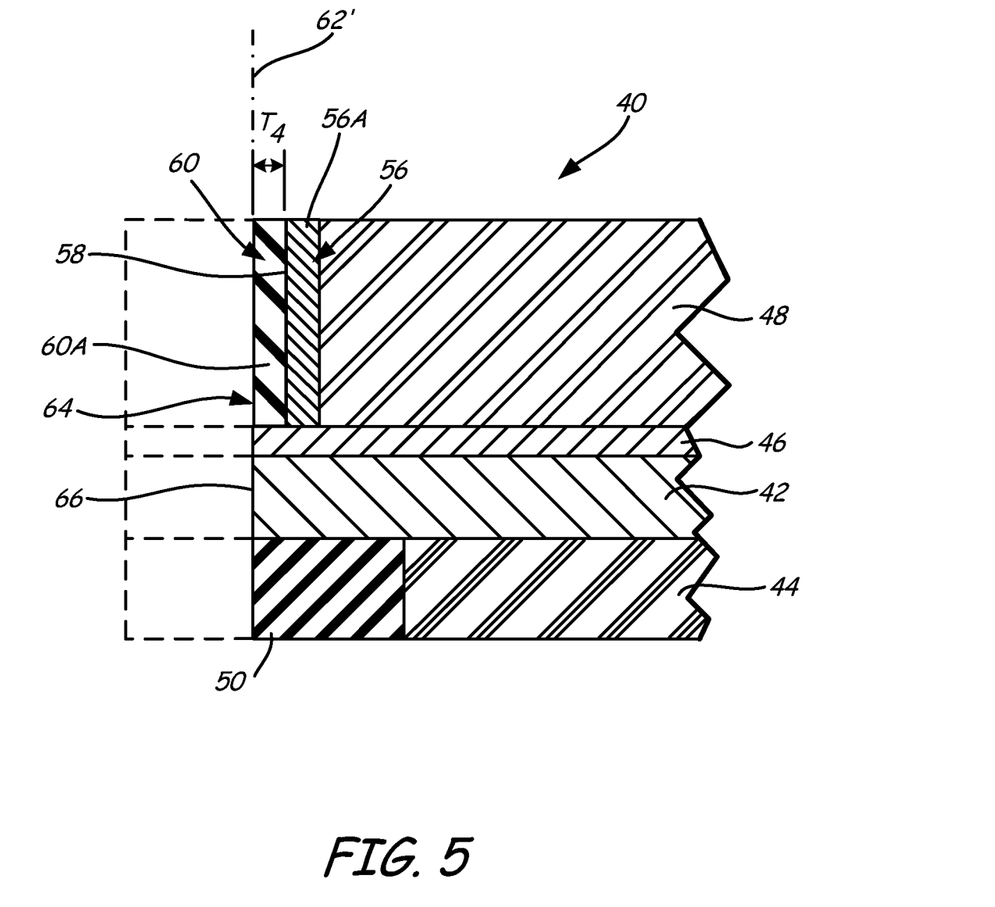
FIG. 5 is a cross-sectional view of an embodiment of the portion of the transducing head of FIGS. 1-3 after fabrication.

FIG. 5 is a cross-sectional view of an alternative embodiment of the portion of the transducing head 40 after completion of the lapping operation, that is, at or near completion of fabrication at a stage subsequent to that shown in FIG. 3. Portions of the transducing head 40 removed by the lapping operation are shown in phantom. As shown in FIG. 5, an alternative lapping target 62' has been selected that is spaced from the surface 58 of the front shield first portion 56A by a distance $T_4$. The ABS 64 is defined at a location that corresponds to the location of the lapping target 62'. In the illustrated embodiment, a backfill first portion 60A remains after the lapping operation, which removes part of the backfill 60. The backfill first portion 60A acts as a spacer, such that the front shield first portion 56A is recessed from the ABS 64.

As noted above, lapping operations generally involve some variation from a given lapping target, and a lapping variation on the order of plus or minus about 15 nm is common. By selecting the distance $T_4$ to be at least equal to a given lapping variation (e.g., greater than about 15 nm), a risk of reduction of the thickness $T_2$ during the lapping operation can be reduced or eliminated. If the distance $T_3$ is selected to be greater than a given lapping variation (e.g., greater than about 15 nm), the backfill first portion 60A will remain after lapping despite any lapping variation that removes additional amounts of the backfill 60 closer to the front shield first portion 56A from the lapping target 62'.

The presence of the backfill first portion 60A can provide advantages. For example, because the ABS 64 is subject to potential wear during use (e.g., due to oxidation, burnishing, contact between a slider and the rotating magnetic storage medium, etc.), material properties of the backfill first portion 60A can be selected to control wear characteristics of the transducing head 40. The backfill first portion 60A is a "close point", that is, it represents a portion of the writer of the transducing head 40 with the least separation from an associated storage medium (e.g., magnetic disc of an HDD system). The ability to maintain a relatively constant thickness of the backfill first portion 60A over time, and therefore also a relatively constant separation of the front shield first portion 56A from the associated storage medium, can be beneficial. Additionally, selection of material properties of the backfill first portion 60A can help control a thermomechanical profile of the transducing head 40 near the main writer pole 42. This can, for example, help control pole and shield recession characteristics during operation of the transducing head 40.

Figure 6:
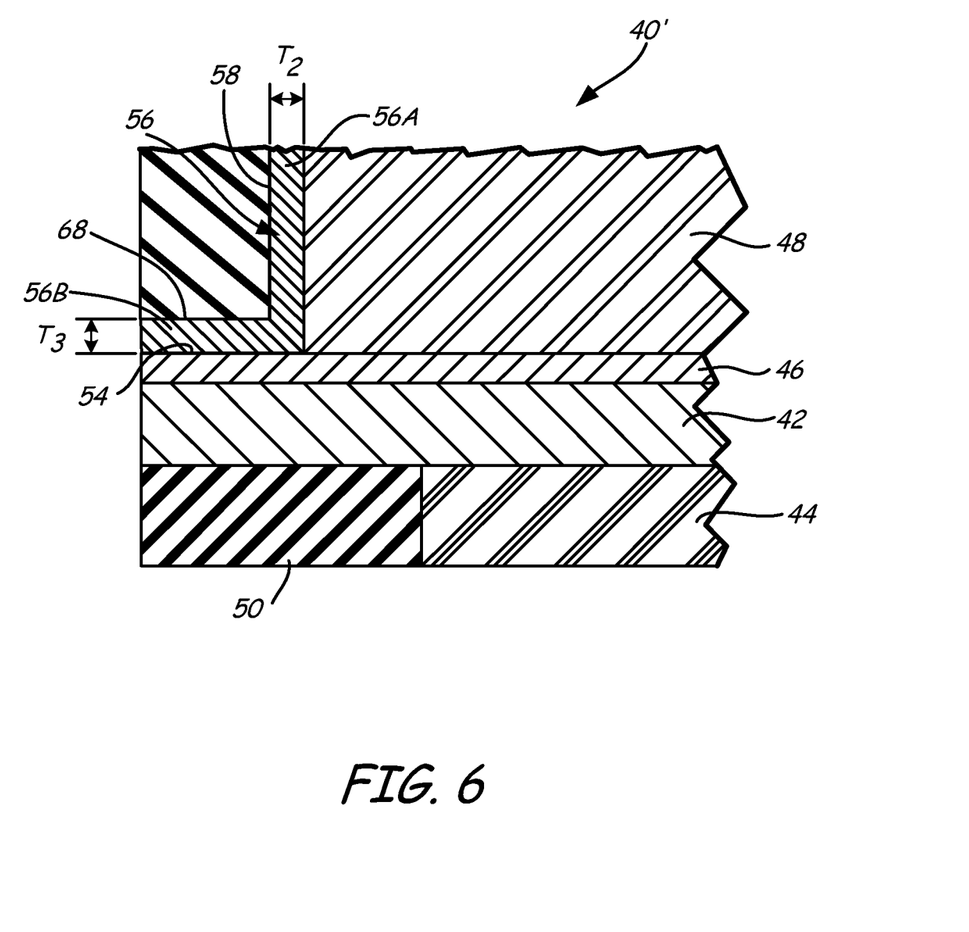
FIG. 6 is a cross-sectional view of a portion of an embodiment of a transducing head during various stages of fabrication.

Numerous alternative front shield configurations are possible according to the present invention. FIG. 6 is a cross-sectional view of a portion of another embodiment of a transducing head 40' during fabrication. The transducing head 40' can be configured similarly to the transducing head 40 shown in FIG. 1. However, later fabrication stages for the transducing head 40' can differ from those for the transducing head 40. As shown in FIG. 6, both the front shield first portion 56A and the front shield second portion 56B are present, which can be accomplished by suitably adjusting the etching process to leave at least a portion of the front shield second portion 56B intact (or by omitting the etching process entirely). In the illustrated embodiment, the front shield first portion 56A and the front shield second portion 56B are each substantially rectangular in cross-section and form an "L" shape. Formation of the surface 58 still results in definition of a maximum value of the thickness $T_2$.

The front shield second portion 56B defines a surface 68, which can be arranged substantially parallel to the surface 54 of the gap layer 46. In the illustrated embodiment, the front shield second portion 56B adjoins the front shield first portion 56A, and the surface 54 of the gap layer 46 is covered by the front shield material 56. The thickness $T_2$ can be greater than about 10 nm, such as in the range of approximately 10-100 nm, and in one embodiment can be about 50-100 nm and in another embodiment can be about 50 nm. The front shield second portion 56B can have a thickness $T_3$ approximately equal to $T_2$, though the particular values of each of the thicknesses $T_2$ and $T_3$ can independently vary as desired for particular applications.

Backfill 60 is deposited adjacent to the surface 58 of the front shield first portion 56A and the surface 68 of the front shield second portion 56B. The backfill 60 can be a non-ferromagnetic material, such as Ta, and can be a material similar or dissimilar to that of the backfill 50. After the backfill 60 has been deposited, a lapping operation can then be performed to define an ABS for the transducing head 40'.

Figure 7:
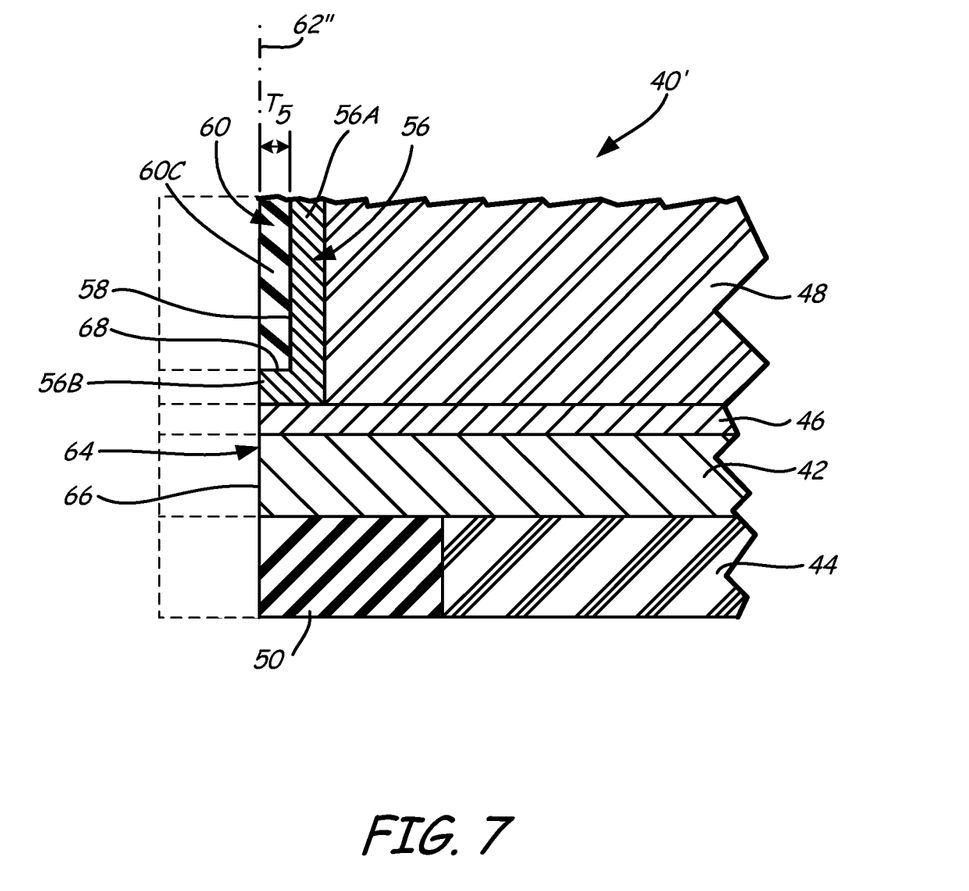
FIG. 7 is a cross-sectional view of an embodiment of the portion of the transducing head of FIG. 6 after completion of fabrication.

FIG. 7 is a cross-sectional view of one embodiment of the portion of the transducing head of FIG. 6 after completion of the lapping operation, that is, at or near completion of fabrication at a stage subsequent to that shown in FIG. 6. Portions of the transducing head 40' removed by the lapping operation are shown in phantom. As shown in FIG. 7, a lapping target 62" has been selected that is spaced from the surface 58 of the front shield first portion 56A by a distance $T_5$. The ABS 64 is defined at a location that corresponds to the location of the lapping target 62". It should be appreciated that the location of the lapping target 62" can vary as desired for particular applications. In the illustrated embodiment, a backfill portion 60C remains after the lapping operation, which removes part of the backfill 60 shown in phantom. The backfill portion 60C thus acts as a spacer, such that the front shield first portion 56A is recessed from the ABS 64. However, the front shield second portion 56B extends to the ABS 64, and is exposed at the ABS 64.

As noted above, lapping operations generally involve some variation from a given lapping target, and a lapping variation on the order of plus or minus about 15 nm is common. By selecting the distance $T_5$ to be at least equal to a given lapping variation (e.g., greater than about 15 nm), a risk of reduction of the thickness $T_2$ of the front shield first portion 56A during the lapping operation can be reduced or eliminated. If the distance $T_5$ is selected to be greater than a given lapping variation (e.g., greater than about 15 nm), the backfill portion 60C will remain adjacent to the front shield first portion 56A after lapping despite any lapping variation that removes additional amounts of the backfill 60 closer to the front shield first portion 56A from the lapping target 62''. However, in this embodiment of the transducing head 40', the front shield second portion 56B generally extends to the ABS 64 regardless of where the lapping target 62'' is located or the amount of lapping variation. This configuration can help reduce performance variations caused by front shield recession during operation, because the front shield second portion 56B will generally always extend to the ABS 64.

Figure 8:
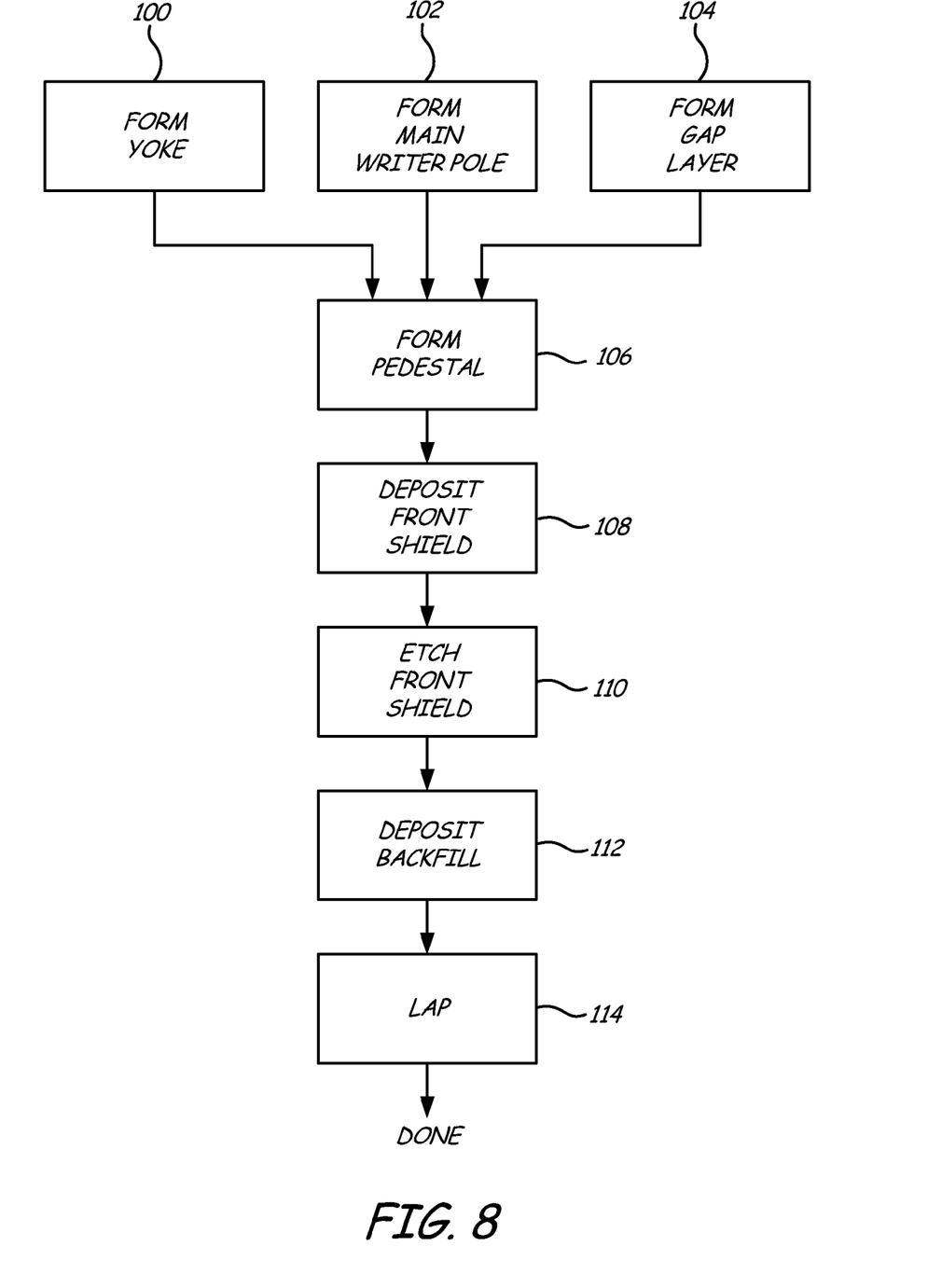
FIG. 8 is a flow chart of a method of fabricating a transducing head according to the present invention.

FIG. 8 is a flow chart of a method of fabricating a transducing head according to the present invention. Initially, a yoke, a main writer pole and a gap layer are formed (steps 100, 102 and 104, respectively). Steps 100, 102 and 104 can be performed in any order as desired for particular applications. It should also be noted that these steps can be performed in a conventional manner, and can include any suitable deposition, patterning, material removal, or other processes as desired. Steps 100, 102 and 104 are discussed herein merely to provide context for the method steps described below. Therefore, steps 100, 102 and 104 can be omitted, and additional steps not specifically mentioned can be included in alternative embodiments.

Next, a pedestal is formed (step 106). The pedestal can be formed on the gap layer. It should be understood that formation of the pedestal at step 106 can include any suitable deposition, patterning, material removal, or other processes as desired. The formed pedestal generally provides an edge at which front shield material will later be deposited.

After the pedestal has been formed, front shield material is deposited adjacent to the pedestal, and generally also adjacent to surface of the gap layer (step 108). The front shield material can be deposited, for instance, using ion beam deposition (IBD), plasma vapor deposition (PVD), atomic layer deposition (ALD), or other suitable conformal deposition techniques. The front shield material is then etched (step 110). Step 110 removes a portion of the front shield material, leaving at least a portion of the deposited front shield material in place. The remaining front shield material can have any desired configuration. The etching process defines a maximum thickness of the front shield (in a direction of the throat height). Etching techniques suitable for removing the portion of the front shield material include ion milling, reactive ion etching, reactive ion beam etching, and other known etching processes.

After the front shield material has been etched to a desired configuration, backfill is deposited adjacent to the remaining front shield material (step 112). Then a lapping operation is performed to define an ABS for the transducing head (step 114). Lapping can include setting a lapping target and then performing the lapping operation to remove material to the lapping target. Because the maximum thickness of the front shield was previously defined, the thickness cannot increase during the lapping operation. Furthermore, if the lapping target is established at a distance greater than or equal to a lapping variation associated with the lapping operation, then a minimum thickness of the front shield can remain unchanged during the lapping operation. Moreover, if the lapping target is established at a distance greater than the lapping variation associated with the lapping operation, then a portion of the backfill will remain as a spacer between the remaining front shield material and the ABS.

Figure 9:
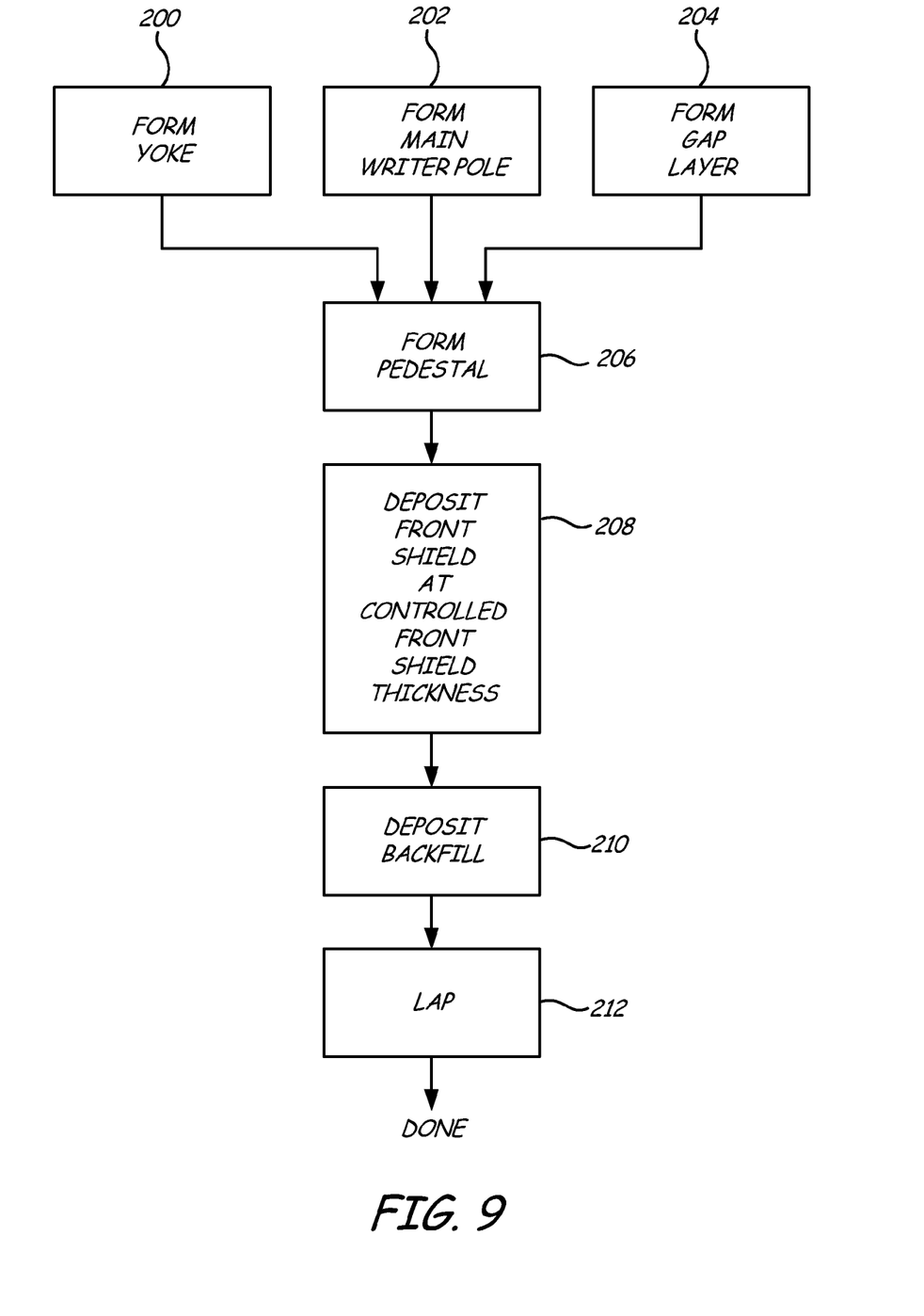
FIG. 9 is a flow chart of an embodiment of a method of fabricating the transducing head.

FIG. 9 is a flow chart of an alternative embodiment of a method of fabricating the transducing head. Initially, a yoke, a main writer pole and a gap layer are formed (steps 200, 202 and 204, respectively). Steps 200, 202 and 204 can be performed in any order as desired for particular applications. It should also be noted that these steps can be performed in a conventional manner, and can include any suitable deposition, patterning, material removal, or other processes as desired. Steps 200, 202 and 204 are discussed herein merely to provide context for the method steps described below. Therefore, steps 200, 202 and 204 can be omitted, and additional steps not specifically mentioned can be included in alternative embodiments.

Next, a pedestal is formed (step 206). The pedestal can be formed on the gap layer. It should be understood that formation of the pedestal at step 206 can include any suitable deposition, patterning, material removal, or other processes as desired. The formed pedestal generally provides an edge at which front shield material will later be deposited.

After the pedestal has been formed, front shield material is deposited adjacent to the pedestal at a controlled thickness, and generally also adjacent to surface of the gap layer (step 208). In this embodiment, the deposition process defines a maximum thickness of the front shield, reducing or eliminating the need for subsequent material removal steps (i.e., etching).

After the front shield material is in place in a desired configuration, backfill is deposited adjacent to the front shield material (step 210). Then a lapping operation is performed to define an ABS for the transducing head (step 212). Lapping can include setting a lapping target and then performing the lapping operation to remove material to the lapping target. Because the maximum thickness of the front shield was previously defined, the thickness cannot increase during the lapping operation. Furthermore, if the lapping target is established at a distance greater than or equal to a lapping variation associated with the lapping operation, then a minimum thickness of the front shield can remain unchanged during the lapping operation. Moreover, if the lapping target is established at a distance greater than the lapping variation associated with the lapping operation, then a portion of the backfill will remain as a spacer between the front shield material and the ABS.

Although the present invention has been described with reference to preferred embodiments, workers skilled in the art will recognize that changes may be made in form and detail without departing from the spirit and scope of the invention. For example, additional structures and additional fabrication processes not specifically discussed can be utilized with the present invention.

The invention claimed is:

1. A magnetic writer comprising:
 a writer pole defining a pole tip at an air bearing surface on the transducing head;
 a gap layer;
 a pedestal, wherein the gap layer extends between the writer pole and the pedestal;
 a front shield positioned adjacent to the pedestal and the gap layer, wherein a first portion of the front shield is positioned between the air bearing surface and the pedestal and spaced from the air bearing surface by a backfill layer positioned at the ABS and having a surface in contact with the gap layer.

2. The writer of claim 1, wherein the backfill layer is in contact with the gap layer at the air bearing surface.

3. A transducing head prepared by a process comprising:
forming a pedestal adjacent to a gap layer;
depositing a front shield on the pedestal such that a portion of the front shield is in contact with the pedestal on one side and in contact with the gap layer on another side;
etching the front shield, wherein the front shield has a controlled thickness upon etching;
depositing a backfill layer upon the front shield after etching; and
lapping the transducing head to define an air bearing surface such that the backfill layer is in contact with the gap layer at the air bearing surface, wherein lapping the transducing head removes at least a portion of the backfill layer and leaves at least a portion of the backfill layer between the air bearing surface and the front shield.

4. The transducing head of claim 3, wherein the backfill layer is made of a non-ferromagnetic material.

5. The transducing head of claim 4, wherein lapping the transducing head leaves the backfill layer between the front shield and the air bearing surface.

6. The transducing head of claim 4, wherein the thickness of the front shield is in the range of 10-100 nm.

7. The transducing head of claim 3, wherein the front shield is deposited using an ion beam deposition technique.

8. The transducing head of claim 3, wherein the front shield is deposited using a plasma vapor deposition technique.

9. The transducing head of claim 3, wherein the front shield is etched using an ion milling technique.

10. The transducing head of claim 3, wherein the front shield is etched using a reactive ion etching technique.

11. The transducing head of claim 3, wherein the front shield is etched using a reactive ion beam etching technique.

12. The transducing head of claim 3, wherein the process further comprising:
forming a writer pole; and
forming the gap layer adjacent to the writer pole, wherein the gap layer extends between the writer pole and the pedestal.

13. A transducing head comprising:
a writer pole defining a pole tip at an air bearing surface on the transducing head;
a pedestal, wherein a gap layer extends between the writer pole and the pedestal;
a front shield in contact with the pedestal and the gap layer; and
a backfill layer positioned at the air bearing surface, wherein the front shield is positioned between the backfill layer and the pedestal and spaced from the air bearing surface by at least a portion of the back fill layer and wherein the backfill layer is in contact with the gap layer.

14. The transducing head of claim 13, wherein the backfill layer is made of a non-ferromagnetic material.

15. The transducing head of claim 13, wherein the thickness of shield is between 10 nm and 100 nm.

16. The transducing head of claim 13, wherein the backfill layer is in contact with the gap layer at the air bearing surface.

17. The transducing head of claim 16, wherein the front shield is made of NiFe.

18. The transducing head of claim 16, wherein the backfill layer is made of tantalum.

* * * * *